United States Patent
Thrasher et al.

(10) Patent No.: US 12,404,216 B2
(45) Date of Patent: Sep. 2, 2025

(54) ADDITIVE MANUFACTURING METHODS FOR FORMING HIGH-TEMPERATURE COMPOSITE STRUCTURES AND RELATED STRUCTURES

(71) Applicant: Northrop Grumman Systems Corporation, Falls Church, VA (US)

(72) Inventors: Talbot P. Thrasher, Newark, DE (US); Timothy E. Dominick, Elkton, MD (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 18/508,839

(22) Filed: Nov. 14, 2023

(65) Prior Publication Data

US 2024/0083823 A1    Mar. 14, 2024

Related U.S. Application Data

(63) Continuation of application No. 16/516,104, filed on Jul. 18, 2019, now Pat. No. 11,814,324.

(51) Int. Cl.
*C04B 35/83* (2006.01)
*B29C 64/118* (2017.01)
(Continued)

(52) U.S. Cl.
CPC ............ *C04B 35/83* (2013.01); *B29C 64/118* (2017.08); *B29C 64/30* (2017.08); *B33Y 10/00* (2014.12);
(Continued)

(58) Field of Classification Search
None
See application file for complete search history.

(56) References Cited

U.S. PATENT DOCUMENTS

| 5,039,635 A | 8/1991 | Stempin et al. |
| 5,380,556 A | 1/1995 | Hocquellet |

(Continued)

FOREIGN PATENT DOCUMENTS

| CN | 109414912 A | 3/2019 |
| CN | 109704800 A | 5/2019 |

(Continued)

OTHER PUBLICATIONS

Abbasali Saboktain, "3D Textile Preforms and Composites for Aircraft Strcutures: A Review," International Journal of Aviation, Aeronautics, and Aerospace, vol. 6, (2019), 41 pages.

(Continued)

*Primary Examiner* — Jeffrey D Washville
(74) *Attorney, Agent, or Firm* — TraskBritt (57) ABSTRACT

Methods for fabricating high-temperature composite structures (e.g., structures comprising carbon-carbon composite materials or ceramic composite matrix (CMC) materials and configured for use at temperature at or exceeding about 2000° F. (1093° C.)) include forming precursor structures by additive manufacturing ("AM") (e.g., "3D printing") with a filament drawn from a spool. The precursor structures are exposed to high temperatures to pyrolyze a precursor matric material of the initial 3D printed structure. A liquid resin is used to impregnate the pyrolyzed structure, to densify the structure into a near-net final shape. Use of expensive and time-consuming molds and post-processing machining may be avoided. Large, unitary, integrally formed parts conducive for use in high-temperature environments may be formed using the methods of the disclosure.

20 Claims, 7 Drawing Sheets

(51) Int. Cl.
  *B29C 64/30*    (2017.01)
  *B29K 71/00*    (2006.01)
  *B29K 81/00*    (2006.01)
  *B33Y 10/00*    (2015.01)
  *B33Y 40/00*    (2020.01)
  *B33Y 80/00*    (2015.01)
  *C04B 35/622*   (2006.01)
  *C04B 35/628*   (2006.01)
  *C04B 35/64*    (2006.01)

(52) U.S. Cl.
  CPC ............... *B33Y 40/00* (2014.12); *B33Y 80/00* (2014.12); *C04B 35/6224* (2013.01); *C04B 35/62272* (2013.01); *C04B 35/62844* (2013.01); *C04B 35/62886* (2013.01); *C04B 35/64* (2013.01); *B29K 2071/00* (2013.01); *B29K 2081/04* (2013.01); *C04B 2235/422* (2013.01); *C04B 2235/5232* (2013.01); *C04B 2235/5248* (2013.01); *C04B 2235/5252* (2013.01); *C04B 2235/6026* (2013.01); *C04B 2235/616* (2013.01); *C04B 2235/656* (2013.01)

(56) References Cited

U.S. PATENT DOCUMENTS

| | | | |
|---|---|---|---|
| 5,580,834 | A | 12/1996 | Pfaff |
| 6,121,169 | A | 9/2000 | Carpenter et al. |
| 8,974,891 | B2 | 3/2015 | Riedell |
| 9,944,526 | B2 | 4/2018 | Troester et al. |
| 10,035,305 | B2 | 7/2018 | La Forest et al. |
| 10,131,113 | B2 | 11/2018 | Troester et al. |
| 10,300,631 | B2 | 5/2019 | La Forest et al. |
| 11,117,319 | B2 | 9/2021 | Barnes et al. |
| 11,167,483 | B2 | 11/2021 | Barnes et al. |
| 11,167,484 | B2 | 11/2021 | Barnes et al. |
| 11,173,654 | B2 | 11/2021 | Barnes et al. |
| 11,220,044 | B2 | 1/2022 | Barnes et al. |
| 11,413,806 | B2 | 8/2022 | Barnes et al. |
| 2003/0003286 | A1 | 1/2003 | Gruber et al. |
| 2003/0032868 | A1 | 2/2003 | Graskov et al. |
| 2014/0361460 | A1* | 12/2014 | Mark .................... B29C 64/141 264/248 |
| 2015/0360418 | A1 | 12/2015 | Shah et al. |
| 2016/0332919 | A1 | 11/2016 | Fryska et al. |
| 2018/0127080 | A1 | 5/2018 | Tyler et al. |
| 2018/0154437 | A1* | 6/2018 | Mark .................... B33Y 10/00 |
| 2018/0328189 | A1 | 11/2018 | Frey et al. |
| 2019/0233335 | A1 | 8/2019 | Pyzik et al. |

FOREIGN PATENT DOCUMENTS

| | | |
|---|---|---|
| EP | 0673900 A2 | 9/1995 |
| EP | 3475081 A1 | 7/2020 |
| WO | 2016/077473 A1 | 5/2016 |
| WO | 2018/005350 A1 | 1/2018 |
| WO | 2018/102739 A1 | 6/2018 |

OTHER PUBLICATIONS

Australian Patent Examination Report No. 1 for Australian Application No. 2020205252, dated Apr. 24, 2021, 4 pages.
European Communication pursuant to Article 94(3) EPC for European Application No. 20186168.9, dated Jul. 11, 2022, 7 pages.
European Communication pursuant to Article 94(3) EPC for European Application No. 20186168.9, dated Mar. 9, 2023, 7 pages.
European Communication pursuant to Article 94(3) EPC for European Application No. 20186168.9, dated Oct. 28, 2021, 8 pages.
European Extended Search Report and Opinion for European Application No. 20186168.9, dated Dec. 16, 2020, 10 pages.
India Patent Examination Report for India Application No. 202034030428, dated Jul. 5, 2022, 7 pages.
Michael Chapiro, "Current Achievements and Future Outlook for Composites in 3D Printing", Reinforced Plastics, vol. 60, Issue 6, (Nov. 2016), pp. 372-375.
Michael Chapiro, "Full-Strength 5-Axis Carbon Fibre 3D Printing Revolutionizes Aviation and Space," JEC Composites Magazine, vol. 55, (Aug.-Sep. 2018), pp. 18-20.
Michael Chapiro, "Will composites be competitive with metals in 3D printing?," JEC Composites Magazine, (Oct. 2016), pp. 28-29.

* cited by examiner

ADDITIVE MANUFACTURING METHODS FOR FORMING HIGH-TEMPERATURE COMPOSITE STRUCTURES AND RELATED STRUCTURES

CROSS-REFERENCE TO RELATED APPLICATIONS

This application is a continuation of U.S. patent application Ser. No. 16/516,104, filed Jul. 18, 2019 (now U.S. Pat. No. 11,814,324, issued Nov. 14, 2023), 2023, the subject matter of which is related to the subject matter of U.S. patent application Ser. No. 16/380,066 (now U.S. Pat. No. 11,220,044, issued Jan. 11, 2022); U.S. patent application Ser. No. 16/380,131 (now U.S. Pat. No. 11,167,483, issued Nov. 9, 2021); U.S. patent application Ser. No. 16/380,208 (now U.S. Pat. No. 11,173,654, issued Nov. 16, 2021); U.S. patent application Ser. No. 16/380,272 (now U.S. U.S. Pat. No. 11,413,806, issued Aug. 16, 2022); U.S. patent application Ser. No. 16/380,328 (now U.S. Pat. No. 11,167,484, issued Nov. 9, 2021); and U.S. patent application Ser. No. 16/380,390 (now U.S. Pat. No. 11,117,319, issued Sep. 14, 2021), all filed Apr. 10, 2019, and the disclosure of each of the foregoing applications is hereby incorporated herein in its entirety by this reference.

TECHNICAL FIELD

Embodiments of the disclosure relate to methods for forming three-dimensional (3D) integrated composite structures and to related structures and, more particularly, to methods for forming high-temperature carbon-carbon (C/C) structures or ceramic matrix composite (CMC) structures by multi-axis additive manufacturing with subsequent densification using a liquid resin, and to related structures.

BACKGROUND

High-temperature structures, particularly those to be used in the aerospace industry, are conventionally fabricated from composite materials (e.g., reinforced materials), such as carbon-fiber-reinforced carbon matrix materials (e.g., carbon-carbon composite (C/C) materials) or fiber-reinforced (e.g., carbon-fiber-reinforced, glass-fiber-reinforced, quartz-fiber-reinforced, ceramic-fiber-reinforced, other-fiber-reinforced) ceramic matrix composite (CMC) materials. These "composite materials" include a matrix phase (e.g., carbon matrix, ceramic matrix) in which a reinforcing fiber phase is embedded. To form conventional composite material structures, conventional fabrication techniques generally use time-consuming and costly processes in which intricate continuous-fiber multi-axial textiles are woven (e.g., into a "dry preform") and infused with polymeric materials to form a composite substance (e.g., "block") that is placed in or on molds prior to heating (e.g., curing (e.g., autoclave curing)) to form a machinable block. Alternatively, continuous fiber reinforced polymer precursor materials (i.e., "prepreg" materials) are assembled (e.g., "laid up")—often by hand—in multiple layers (e.g., into a "wet preform") in or on molds prior to heating (e.g., curing (e.g., autoclave curing)) to convert the "laid up" precursor structures into final, rigid structures. These processes tend to be labor intensive (e.g., often requiring highly-trained technicians), be expensive (e.g., including the cost of fabricating the molds), require a long lead time (e.g., to allow time to fabricate the molds before the fabrication of the dry preforms or before the laying-up of prepreg materials into the wet preforms), and require expensive tooling.

Adding to the cost, timing, and complexity of conventional fabrication methods, forming structures by such processes also often involves forming several smaller parts and then assembling them together (e.g., with seals, joints), to form a final, assembled, larger component of a device or system. Great time and care is required to ensure that fabricated structures are free from unwanted gaps that could be points of failure during use of the assembled parts.

Moreover, the composite material structures formed by conventional composite-material-fabrication techniques are generally essentially-solid blocks, or thick-walled billets, of material that are then machined and shaped into a final, desired shape. These end-process machining and shaping steps, and the tooling needed for such steps, also add to the time and cost of the fabrication process and, if not performed precisely, may introduce defects into the final structure.

Accordingly, fabricating high-temperature composite structures continues to present challenges.

BRIEF SUMMARY

In some embodiments, a method—for forming a high-temperature composite structure—comprises forming a 3D precursor structure. Forming the 3D precursor structure comprises depositing, along a direction, an amount of a filament material. The filament material comprises a precursor matrix material having embedded therein a fiber material. An additional amount of the filament material is deposited on the amount of the filament material. The 3D precursor structure is pyrolyzed to form a pyrolyzed intermediate structure. The pyrolyzed intermediate structure is impregnated with a liquid resin to form an impregnated structure. The impregnated structure is exposed to a high-temperature environment to solidify material from the liquid resin within pores of the pyrolyzed intermediate structure.

In some embodiments, a method—for forming a composite structure—comprises heating a precursor structure comprising a precursor matrix material embedded with a reinforcing material to solidify at least some of the precursor matrix material and form an intermediate structure. The intermediate structure is impregnated with a liquid resin to add carbon or ceramic material to the intermediate structure and form a densified structure. The densified structure is heated at a temperature between about 932° F. (500° C.) and about 5432° F. (3000° C.).

Moreover, in some embodiments, a method—of forming a high-temperature carbon-carbon or ceramic matrix composite sandwich structure—comprises operating a robotic 3D printing machine to lay, along an axis, a precursor matrix material comprising a fiber embedded therein and form a 3D precursor structure defining at least one void between planar portions. The 3D precursor structure is pyrolyzed at a temperature exceeding about 932° F. (500° C.) to form a porous intermediate structure. A liquid resin—comprising carbon or a preceramic material—is introduced into pores of the porous intermediate structure to form an impregnated intermediate structure. The impregnated intermediate structure is exposed to a temperature exceeding about 932° F. (500° C.).

Also disclosed is a composite structure, formed by pyrolyzing and densifying a 3D printed precursor structure of a precursor matrix material embedded with a reinforcing phase. The composite structure comprises an intermediate portion, defining a series of cells, between an upper portion and a lower portion. The intermediate portion, the upper portion, and the lower portion each comprise a composite material comprising the reinforcing phase embedded within a matrix phase formed from the precursor matrix material. The intermediate portion, the upper portion, and the lower portion are integral with one another.

Moreover, disclosed is a high-temperature composite structure comprising a pyrolyzed structure comprising a matrix phase having an embedded reinforcing phase. The pyrolyzed structure defines a sandwich structure. The high-temperature composite structure also comprises solid carbon or ceramic material filling pores of the pyrolyzed structure.

DETAILED DESCRIPTION

Disclosed are methods of fabricating high-temperature composite structures using additive manufacturing techniques. Additive manufacturing ("AM") is a technology and technique used for what is commonly referred to in the art as "3D printing."

One type of conventional AM is fused filament fabrication ("FFF"), an AM technique in which a stock material is fed to a heated nozzle, from which the stock material is extruded to be laid down, layer by layer, to build up a desired product. The stock material may be a polymer (e.g., a molten polymer) or a fiber-reinforced polymer material provided in the form of, e.g., pre-shaped filaments or pellets. Upon being extruded from the nozzle, the molten stock material immediately begins to harden. Such conventional "3D" printing systems may not be conducive for use in forming structures that are to be used at high temperatures (e.g., at temperatures about or exceeding 2000° F. (1093° C.)). This is because polymeric materials used in conventional FFF melt well below 1000° F. (538° C.) and would, thus, provide no structural capability at high temperatures. Metallic materials, on the other hand, may be capable of withstanding high temperatures, but using these materials in 3D printing processes may yield structures with intrinsically lower specific strengths than carbon-carbon or CMC structures. Such 3D printed metal-based structures may also be susceptible to degradation (e.g., oxidation) in high-temperature applications and/or may become structurally unsound at high temperatures. Some embodiments of the present disclosure, however, may be tailored for forming composite material parts configured for high-temperature environment use. These methods include densifying precursor structures initially formed by additive manufacturing (i.e., by 3D printing).

The additive manufacturing methods of embodiments of the disclosure may use 3D printers configured to print in true "3D" fashion. That is, conventional additive manufacturing (AM) (e.g., "3D printing") technologies may be more accurately characterized as "2.5D printing" because conventional AM processes use machines (e.g., "printers") that build a layer in an x-y plane by disposition of material from a printer head, stop the printer head, move the build platform or the printer head of the printer in the z-direction, and build another layer in another x-y plane. Thus, conventional "3D printing" is a repeated, planar process. In contrast, a true "3D" fabrication process may build (e.g., print) material in more than two axis directions concurrently, i.e., through the x, y, and z directions concurrently. Conventional AM fabrication systems, by being limited to printing throughout the x-y plane in individual layers, are generally able to print embedded fibers to be aligned in generally only the direction of printing in the x-y plane. Thus, printed fibers are typically not aligned with the direction of the highest-expected stress to be experienced by the printed part in use. Thus, the limitations of conventional 3D printing techniques and machines have placed significant limitations on the value of such capabilities in forming structures meant to be used under high stress. Embodiments of the present disclosure, however, may allow implementation of true 3D printing, by which fibers can be oriented along any desired direction or directions, including along a direction of the highest-expected stress to be experienced by the printed part in use.

Embodiments of the present disclosure may also be conducive for use in forming large parts, e.g., integral parts with a greatest dimension of at least 2 feet (at least 61.0 cm) (e.g., greater than 2.5 feet (76.2 cm)). Methods of embodiments of the present disclosure may employ robotic approaches to additive manufacturing that provide greater flexibility and easier scale-up compared to conventional additive manufacturing techniques and systems. That is, conventional additive manufacturing, 3D printing machines often employ a gantry style approach having an end-effector (e.g., print head) that lays down the additive material in the x-y plane. However, gantry style machine approaches can make scalability, affordability, and flexibility a challenge for implementation in association with a single fabrication cell because there is a direct correlation between the size of the part being fabricated and the size of the gantry machine required, where the gantry machine may be capable of only a single operation at one time. Very large parts generally require very large machines, thus driving up the required footprint and machine cost. Robotic approaches, on the other hand, may include multiple robots working in association with the same fabrication cell. Additionally, each robot can be mounted to a movable base that allows for repositioning at different locations within or around the fabrication cell. Robotic approaches allow for additional robot poses that increase the number of degrees of freedom, the ability to fabricate in 3D, and fabrication flexibility through multiple robots performing multiple tasks.

The methods used in embodiments of the present disclosure may form high-temperature composite structures that, following densification, are at "near net shape," meaning that only minor structural refinements may be required to complete the shaping of the material into the desired part. For example, rough edges (if any) may be trimmed, holes may be drilled, and attachments may be affixed, etc., but without having to significantly machine or shape the 3D printed and densified material into the desired shape.

Embodiments of the present disclosure may also be conducive for forming structures with intricate features as integral parts, without the use of joints or seals to join what may have been conventionally formed as several individual parts. In some embodiments, the methods may be used to form structures with intentional void space, such as "sandwich structures." Sandwich structures generally include two relatively-thin, stiff, and strong faces separated by a relatively thick, lightweight core defining void space in repeated cells (e.g., honeycomb-shaped cells), separated by struts or walls extending therebetween, e.g., at transverse or acute angles to other structural members. Conventional processes for forming high-temperature composite structures are generally not conducive for forming such void-including structures because of the great amount of machining of brittle material that would be required.

Accordingly, disclosed are additive manufacturing methods for forming high-temperature composite structures, which composite structures may exhibit low porosity (e.g., as a result of densification performed after the initial additive manufacturing of precursor structures), fibers oriented throughout more than just x- and y-axes, and of potentially large size as unitary, integral pieces, and even integral pieces with complex void spaces, such as sandwich structures.

As used herein, the terms "void" and "opening" may mean a distinguishable volume extending into or through a material, or between regions of material, leaving an intentional gap in that other material or between the regions of material. Unless otherwise described, a "void" or an "opening" is not necessarily empty of gaseous or other material. In a final structure, a "void" or "opening" formed in an identified material or between regions of an identified material may comprise another material other than that in which, or between which, the "void" or "opening" was initially defined.

As used herein, the term "high-temperature," when used in reference to an application (e.g., use) of a structure or to a characteristic of a structure itself—e.g., as in "high-temperature application" and "high-temperature composite structure"—may mean and refer to applications at, or to a structure configured to withstand without detrimental degradation, temperatures at or exceeding about 2000° F. (1093° C.). As used herein, the term "high-temperature" when referring to a fabrication stage, fabrication process, or fabrication environment—e.g., as in a "high-temperature process" or "high-temperature environment" of a fabrication stage—may mean and refer to a fabrication stage, fabrication process, or fabrication environment reaching temperatures of at least about 932° F. (500° C.).

As used herein, the term "at least softened," in reference to a material, means and includes a material that is at least partially deformable (e.g., is extrudable), in contrast to a substantially solid material. An "at least softened" material means and includes a "plasticized," "semi-liquid phase," and "liquid phase" material.

As used herein, the terms "support material" and "support structure" may refer to a material or structure, respectively, that is configured to provide structural support to another material or structure without the support material or support structure being permanently affixed thereto.

As used herein, the terms "z-axis" and "z-direction" mean and refer to an axis or direction, respectively, that is perpendicular to another direction defined as in an "x-y plane." The "z-axis" or "z-direction" are not necessarily perpendicular to the surface of the earth, unless the x-y plane is horizontal to the surface of the earth.

As used herein, the terms "horizontal" or "lateral" mean and include a direction that is parallel to a primary surface of the substrate on which the referenced material or structure is located. The "width" and "length" of a respective region or material may be defined as dimensions in a horizontal plane.

As used herein, the terms "vertical" or "longitudinal" mean and include a direction that is perpendicular to a primary surface of the substrate on which a referenced material or structure is located. The "height" of a respective region or material may be defined as a dimension in a vertical plane.

As used herein, the terms "thickness" or "thinness" mean and include a dimension in a straight-line direction that is normal to the closest surface of an immediately adjacent material or region that is of a different composition or that is otherwise distinguishable from the material or region whose thickness or thinness is discussed.

As used herein, the term "between" is a spatially relative term used to describe the relative disposition of one material, region, or component relative to at least two other materials, regions, or parts. The term "between" may encompass both a disposition of one material, region, or part directly adjacent to the other materials, regions, or parts and a disposition of one material, region, or part indirectly adjacent to the other materials, regions, or part.

As used herein, the term "proximate" is a spatially relative term used to describe disposition of one material, region, or part near to another material, region, or part. The term "proximate" includes dispositions of indirectly adjacent to, directly adjacent to, and internal to.

As used herein, the terms "about" and "approximately," when either is used in reference to a numerical value for a particular parameter, are inclusive of the numerical value and a degree of variance from the numerical value that one of ordinary skill in the art would understand is within acceptable tolerances for the particular parameter. For example, "about" or "approximately," in reference to a numerical value, may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

As used herein, the term "substantially," when referring to a parameter, property, or condition, means and includes the parameter, property, or condition being equal to or within a degree of variance from a given value such that one of ordinary skill in the art would understand such given value to be acceptably met, such as within acceptable manufacturing tolerances. By way of example, depending on the particular parameter, property, or condition that is substantially met, the parameter, property, or condition may be "substantially" a given value when the value is at least 90.0% met, at least 95.0% met, at least 99.0% met, at least 99.9% met, or even at least 100% met.

As used herein, reference to an element as being "on" or "over" another element means and includes the element being directly on top of, adjacent to (e.g., laterally adjacent to, vertically adjacent to), underneath, or in direct contact with the other element. It also includes the element being indirectly on top of, adjacent to (e.g., laterally adjacent to, vertically adjacent to), underneath, or near the other element, with other elements present therebetween. In contrast, when an element is referred to as being "directly on" or "directly adjacent to" another element, there are no intervening elements present.

As used herein, other spatially relative terms, such as "below," "lower," "bottom," "above," "upper," "top," and the like, may be used for ease of description to describe one element's or feature's relationship to another element(s) or feature(s) as illustrated in the figures. Unless otherwise specified, the spatially relative terms are intended to encompass different orientations of the materials in addition to the orientation as depicted in the figures. For example, if materials in the figures are inverted, elements described as "below" or "under" or "on bottom of" other elements or features would then be oriented "above" or "on top of" the other elements or features. Thus, the term "below" may encompass both an orientation of above and below, depending on the context in which the term is used, which will be evident to one of ordinary skill in the art. The materials may be otherwise oriented (rotated ninety degrees, inverted, etc.) and the spatially relative descriptors used herein interpreted accordingly.

As used herein, the terms "comprises," "comprising," "includes," and/or "including" specify the presence of stated features, regions, stages, operations, elements, materials, components, and/or groups, but do not preclude the presence or addition of one or more other features, regions, stages, operations, elements, materials, components, and/or groups thereof.

As used herein, "and/or" includes any and all combinations of one or more of the associated listed items.

As used herein, the singular forms "a," "an," and "the" are intended to include the plural forms as well, unless the context clearly indicates otherwise.

As used herein, the terms "configured" and "configuration" mean and refer to a size, shape, material composition, orientation, and arrangement of a referenced material, structure, assembly, or apparatus so as to facilitate a referenced operation or property of the referenced material, structure, assembly, or apparatus in a predetermined way.

The illustrations presented herein are not meant to be actual views of any particular material, structure, region, part, component, device, system, or stage of fabrication, but are merely idealized representations that are employed to describe embodiments of the disclosure.

The following description provides specific details, such as material types and processing conditions, in order to provide a thorough description of embodiments of the disclosed devices and methods. However, a person of ordinary skill in the art will understand that the embodiments of the devices and methods may be practiced without employing these specific details. Indeed, the embodiments of the devices and methods may be practiced in conjunction with high-temperature materials fabrication techniques employed in the industry.

The fabrication processes described herein do not form a complete process flow for fabricating composite materials, structures, parts, components, or assemblies thereof. The remainder of the fabrication process flow is known to those of ordinary skill in the art. Accordingly, only the methods and structures necessary to understand embodiments of the present methods are described herein.

Unless the context indicates otherwise, the materials described herein may be formed by any suitable technique including. Depending on the specific material to be formed, the technique for forming, heating (e.g., pyrolyzing, graphitizing, carbonizing, curing), and densifying (e.g., impregnating, depositing, carbonizing, ceramicizing, graphitizing) the material may be selected by a person of ordinary skill in the art.

Reference will now be made to the drawings, where like numerals refer to like components throughout. The drawings are not necessarily drawn to scale.

Embodiments of the methods for fabricating high-temperature composite structures may utilize the 3D printing machine and system illustrated in FIGS. 1 through 8 and described below. Other machines, systems, and methods for 3D printing an initial precursor structure for the fabrication of high-temperature composite structures may utilize the machines, systems, and methods described in any of the following U.S. nonprovisional patent applications, each of which was filed Apr. 10, 2019: U.S. patent application Ser. No. 16/380,066; U.S. patent application Ser. No. 16/380,131; U.S. patent application Ser. No. 16/380,208; U.S. patent application Ser. No. 16/380,272; U.S. patent application Ser. No. 16/380,328; and U.S. patent application Ser. No. 16/380,390, the disclosure of each of which is hereby incorporated herein in its entirety by this reference. Although a particular fabrication process, e.g., for forming a 3D precursor structure, is disclosed below, it will be appreciated that any other suitable fabrication process may be utilized to provide the precursor structure.

Figure 1:
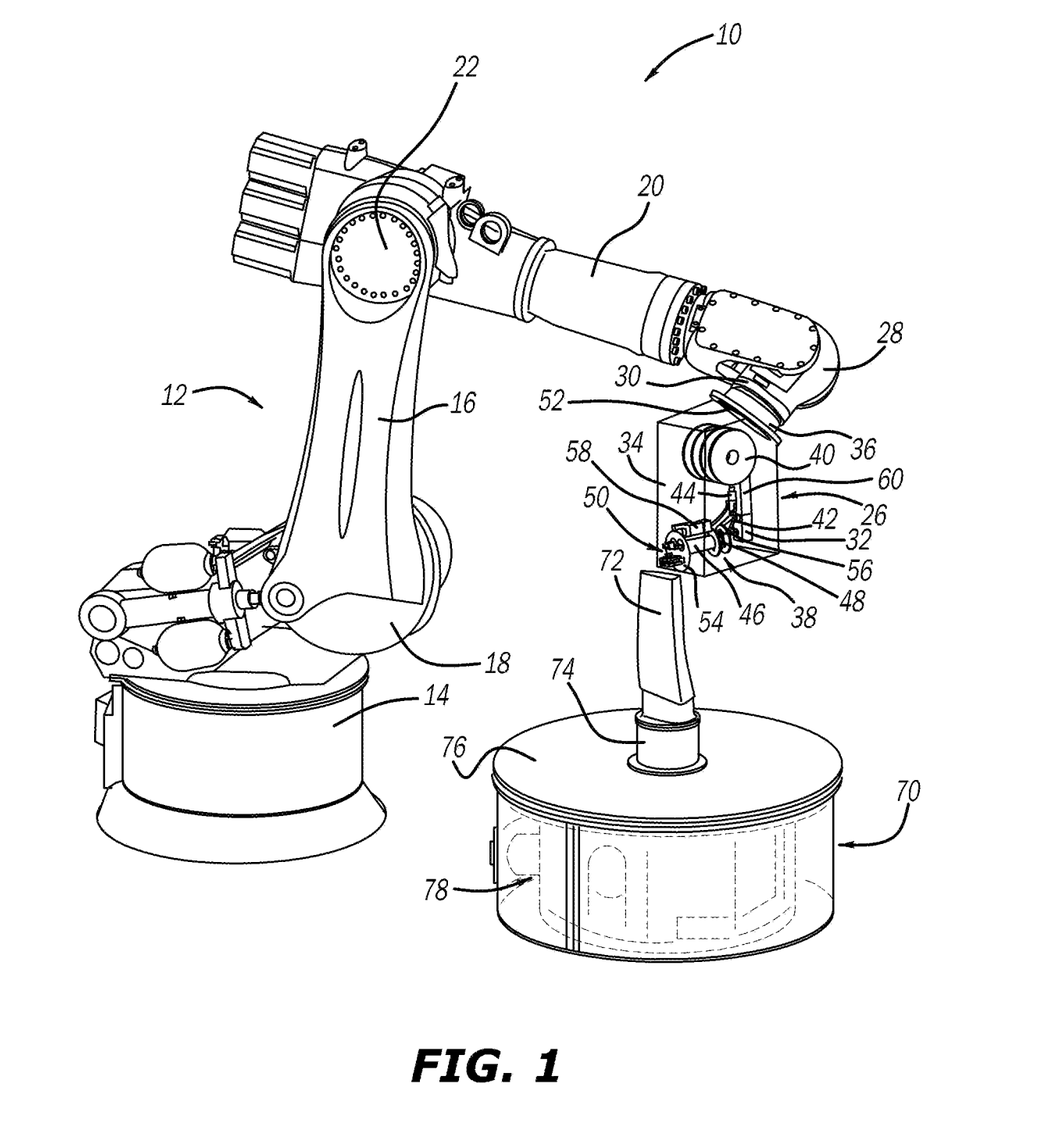
FIG. 1 is an isometric view of a 3D printing machine, including a robot and an end-effector positioned relative to a part being fabricated on a build plate, which 3D printing machine may be utilized according to embodiments of the disclosure.

Turning to FIG. 1, illustrated is an isometric view of a 3D printing machine 10 including a robot 12 having a base portion 14, an extension arm 16 coupled to the base portion 14 by a rotary and pivot joint 18, and a working arm 20 coupled to the extension arm 16 opposite to the base portion 14 by an elbow pivot joint 22. An end-effector 26 is coupled to the working arm 20 at an angle opposite to the joint 22 by a pivot joint 28 having a coupling mechanism 30. The robot 12 is intended to represent any suitable positioning device for the end-effector 26. The end-effector 26 operates as a print-head assembly for laying down an at least softened filament (e.g., a thermally softened filament, a molten filament, etc.) for building a complex composite structure as described herein, for example, for laying down an at least softened filament that includes a precursor matrix material having, embedded therein—at the time of the initial printing—a reinforcing fiber.

The precursor matrix material may be a polymer matrix precursor material, which may be formulated to be processed initially as a thermoplastic (e.g., during the initial printing of the 3D precursor structure) and then subsequently as a thermoset (e.g., during subsequent pyrolysis). Such polymer matrix precursor material may comprise, consist essentially of, or consist of a polyetheretherketone (PEEK), a polyetherketoneketone (PEKK), a polyphenylsulfone (PPSF or PPSU), a polyetherimide (PEI), a polyphenylene (PPS), a polyamide (PA), and/or a polyaryletherketone (PAEK). In other embodiments, the precursor matrix material may comprise, consist essentially of, or consist of acrylonitrile butadiene styrene (ABS), polylactic acid (PLA), and/or polycarbonate (PC). In still other embodiments, the precursor matrix material may comprise, consist essentially of, or consist of a preceramic material.

The fiber, of the reinforcing fiber, may be a high-temperature material formulated to withstand the high temperatures to be employed in the pyrolysis and densification processes described further below. In some embodiments, the fibers may comprise, consist essentially of, or consist of fibers selected from the group consisting of carbon fibers, ceramic fibers, glass fibers, quarts fibers, and basalt fibers. Also envisioned, as structural elements (e.g., reinforcing phase materials) of the high-temperature composite structures of embodiments of the disclosure are other fibers capable of surviving the pyrolysis and densification stages (e.g., cycles) of the disclosed methods.

For example, in some embodiments, the precursor matrix material may comprise a carbon-based precursor matrix material formulated as a PEEK or a PEKK, and the fiber of the fiber reinforcing phase may comprise, consist essentially of, or consist of carbon fibers or ceramic fibers.

The fiber may, in some embodiments, be continuous within the precursor matrix material at the time of the initial 3D printing. In other embodiments, the fiber may be discrete, long-strand fibers within the precursor matrix material at the time of the initial 3D printing. During the initial printing, the fiber may be oriented (e.g., aligned) in the direction of the laid-down material. Therefore, the direction of the end-effector 26 may dictate the orientation of the fibers within the precursor matrix material.

Various end-effectors will be discussed herein that operate in certain manners and have certain features, and that can be attached to the robot 12. It is noted that during operation, the 3D printing machine 10 may or may not be positioned within an oven (not shown) so that the temperature of the printing process and the ambient temperature surrounding the part is controlled.

The end-effector 26 includes an outer housing 34 and a rotatable connector 36 that is releasably and rotatably connected to the coupling mechanism 30, where the outer housing 34 is shown as being transparent to illustrate the various components therein. Those components include a number of spools 40, here three, on which a plurality of filaments 42 of various materials (e.g., materials comprising one or more of the aforementioned fibers embedded within one or more of the aforementioned precursor matrix materials) are wound, a motor 44 for selectively and independently drawing the filaments 42 off of the spools 40, a right angle gear box 32 coupled to a filament feed assembly 48 by a shaft 56, a rotary assembly 38 having a barrel 46 that is turned by an indexing motor 58 and through which the filaments 42 are drawn and melted, an end plate 54 mounted to an end of the barrel 46 and a nozzle assembly 50 that extends through the end plate 54 and is part of the extruder module. The spools 40 can be mounted in the end-effector 26 as shown, or mounted remotely with the material being fed to the end-effector 26 through a tube (not shown). Alternately, the stock material can be provided by pellets instead of using the filament 42.

Figure 2:
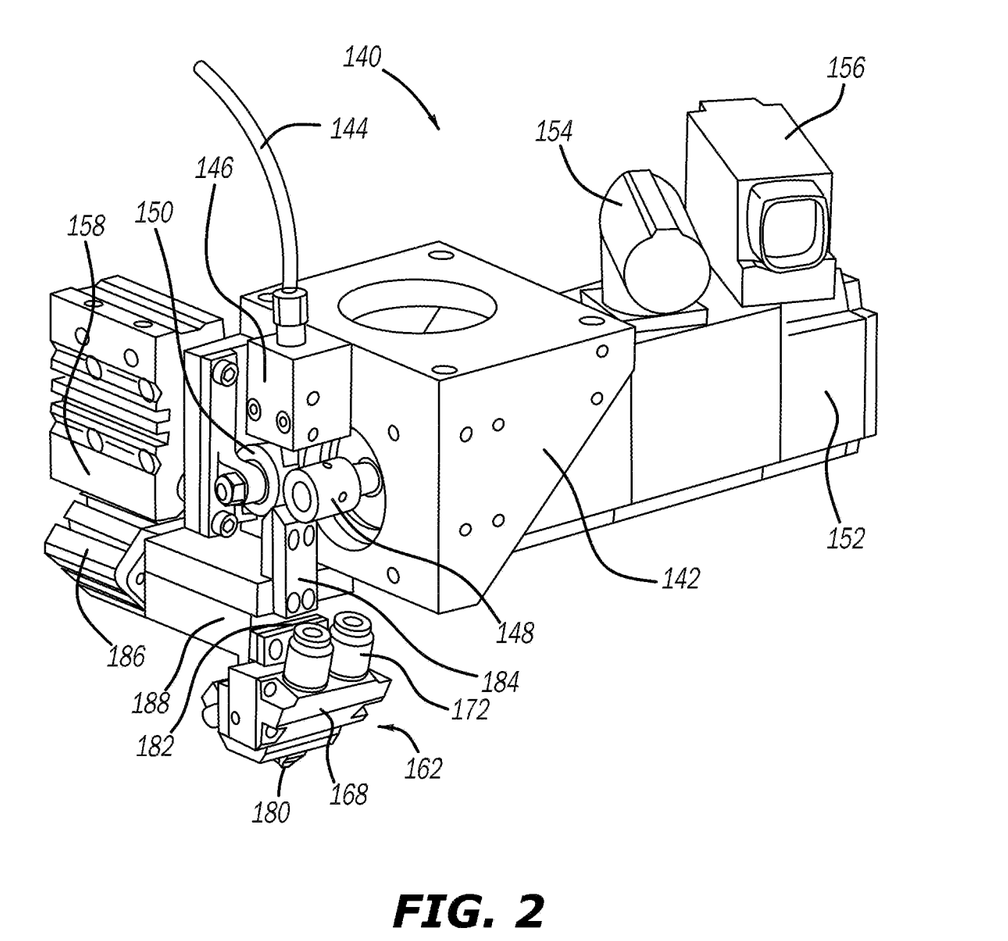
FIG. 2 is an isometric view of a continuous fiber extruder module that may be used in the end-effector shown in FIG. 1.

FIG. 2 is an isometric view of a continuous fiber extruder module 140 that is one non-limiting example of the type of extruder module that can be provided within the end-effector 26 and is rotated by the rotary assembly 38, where the module 140 is fitted with a mounting bracket 142 that allows it to be attached to the end-effector 26. The module 140 receives a filament 138 (see FIG. 4) (e.g., the filament 138 comprising at least one of the aforementioned fibers embedded in at least one of the aforementioned precursor matrix materials) through a filament guide tube 144, where the filament 138 passes through a filament guide tube mounting bracket 146 and then between a feed roller 148 and a clamp roller 150. The feed roller 148 is coupled to a feed motor 152 having a power connector 154 and an encoder 156, which provides the motive force to feed the filament 138 through the module 140. The clamp roller 150 is coupled to a clamp roller actuator 158 that presses the clamp roller 150 against the filament 138, thus pinching the filament between the feed roller 148 and the clamp roller 150 with a selected amount of force, which ensures that sufficient traction is created between the feed roller 148 and the filament 138 to allow the filament 138 to be fed without slipping.

Figure 3:
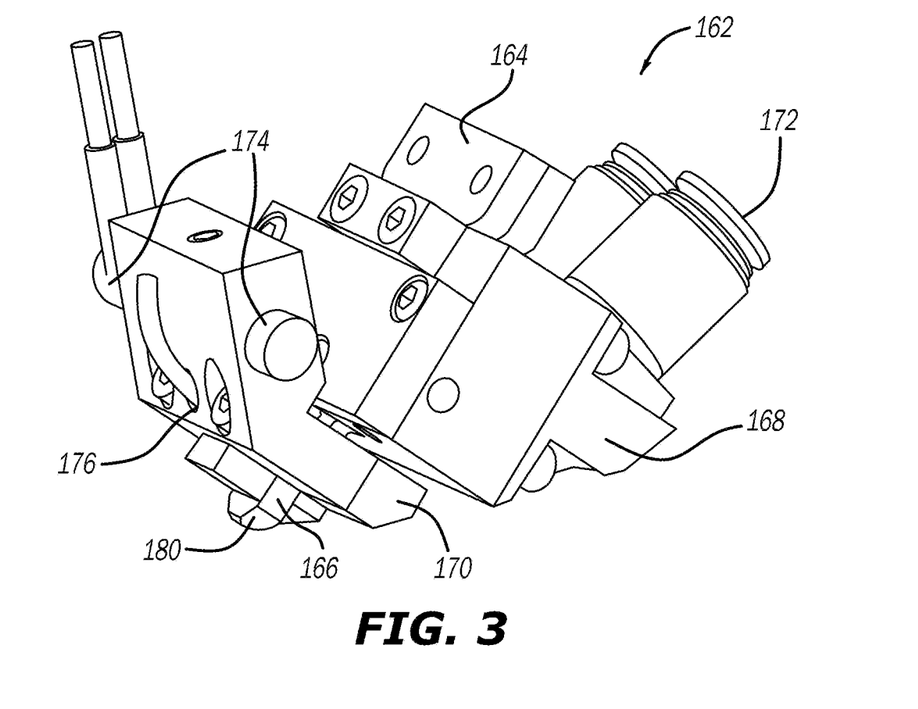
FIG. 3 is an isometric view of a nozzle assembly in the extruder module shown in FIG. 2.
Figure 4:
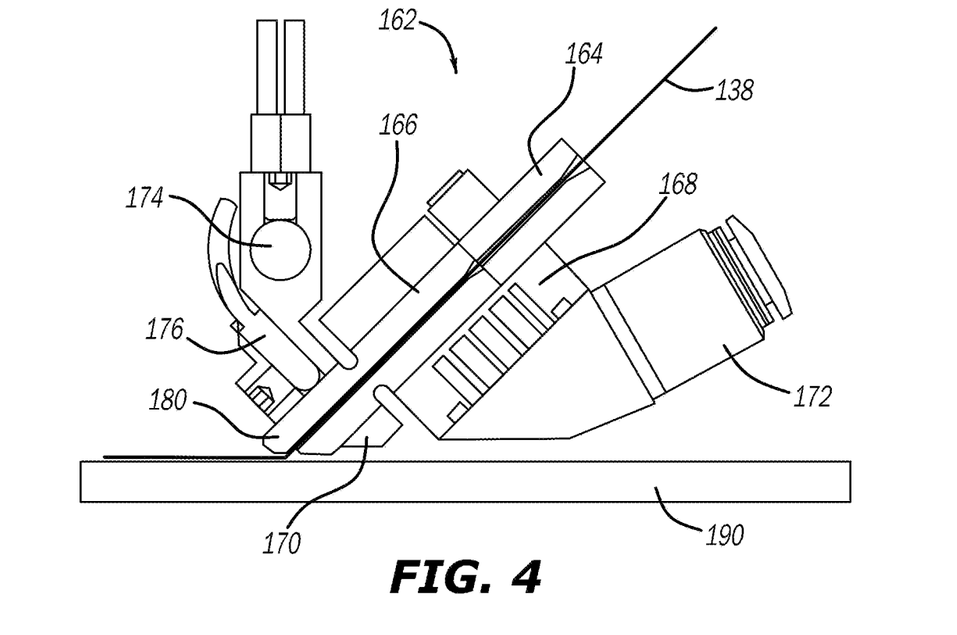
FIG. 4 is a cross-sectional view of the nozzle assembly shown in FIG. 3 relative to a build-plate.

The filament 138 then passes through a filament guide 184 and into a nozzle assembly 162. FIG. 3 is an isometric view and FIG. 4 is a cross-sectional view of the nozzle assembly 162 separated from the module 140. The nozzle assembly 162 includes a filament inlet 164 and a nozzle 166, around which are clamped a cooling block 168 and a heating block 170, where the cooling block 168 receives a liquid coolant through a set of coolant hose connectors 172. The heating block 170 is heated by a heating element 174 and its temperature is monitored by a temperature sensor 176, which could be a thermocouple, thermistor, resistance temperature detector (RTD), or similar type of temperature sensor. This arrangement ensures that the filament 138 remains at a temperature that is less than the melting point of its polymer component (or other precursor matrix material) until it arrives at a nozzle tip 180 of the nozzle 166. The filament 138 is then heated at the end of the nozzle 166 to melt the polymer (or other precursor matrix material) so that the filament 138 will bond to a build surface 190 when it emerges from the nozzle tip 180.

A cutter 182 is provided between a filament guide 184 and the nozzle assembly 162 that is moved by a cutter actuator 186 and is constrained by a cutter guide 188. When the cutter actuator 186 is actuated, it moves the cutter 182 towards the filament 138 at high speed and with a selected amount of force, in a direction perpendicular to the filament feed direction, shearing the filament 138 (e.g., and the reinforcing fiber within the precursor matrix material) against the underside of the filament guide 184 and cutting through the entire filament 138 (e.g., including the fiber within the precursor matrix material). This allows the filament 138 to be automatically cut to the appropriate length as it is being printed. The filament 138 is only extruded from the nozzle 166 in one direction, so the nozzle 166 must be rotated to different orientations in order to be able to extrude the filament 138 in different directions and to orient the fiber (e.g., within the precursor matrix material) of the filament 138 in a desired direction. The desired direction need not be restricted to only an x-y plane, however. This is different from conventional 3D printing nozzle designs, which are not sensitive to the rotation of the nozzle 166 and can print in any direction as long as the print direction is normal to the axis of the nozzle 166, i.e., typically any direction within the x-y plane for a typically vertically downward directed 3D printing nozzle.

The continuous fiber-reinforced 3D printing process is sensitive to the orientation of the nozzle assembly 50. The machine overcomes some of this sensitivity by making the nozzle assembly 50 rotatable. Additionally, by making the nozzle assembly 50 rotatable relative to the rest of the end-effector 26, the direction of the filament 42 as it is extruded from the end-effector 26 can be controlled without needing to rotate the entire end-effector 26. The end-effector 26 may be relatively large and unwieldy compared to the rotary assembly 38, so being able to control the orientation of the extruder module independently of the orientation of the end-effector 26 significantly improves dexterity of the 3D printing machine 10.

As mentioned above, the part (e.g., a high-temperature composite structure) that is being built by the printing process may be formed on a build platform. In the design of the 3D printing machine 10 a rotary circular table 70 may be employed on which a part 72 (e.g., a high-temperature composite structure) being printed or fabricated is shown. An optional riser 74 is provided at a center of the table 70 and the part 72 is positioned on the riser 74. However, it is noted that in some designs, the riser 74 may not be needed. The end-effector 26 is shown positioned adjacent to the part 72 and is in the horizontal orientation. By providing the riser 74 on which the part 72 sits, the part 72 is separated some suitable distance from a top surface 76 of the table 70 so as to provide clearance between the end-effector 26 and the table 70 that is desirable for effectively printing small-diameter parts. In one embodiment, the riser 74 is fabricated from a highly thermally conductive material, such as copper, so as to improve thermal transfer to the part 72 and maintain part thermal stability and adhesion of the part 72 to the surface of the riser 74. The riser 74 can be provided in different shapes, sizes and heights to be more effective for fabrication of parts having a wide range of geometries. A side of the table 70 is shown as being transparent to illustrate suitable components 78 therein that allow the table 70 to be rotated and allow the riser 74 to be heated.

Figure 5:
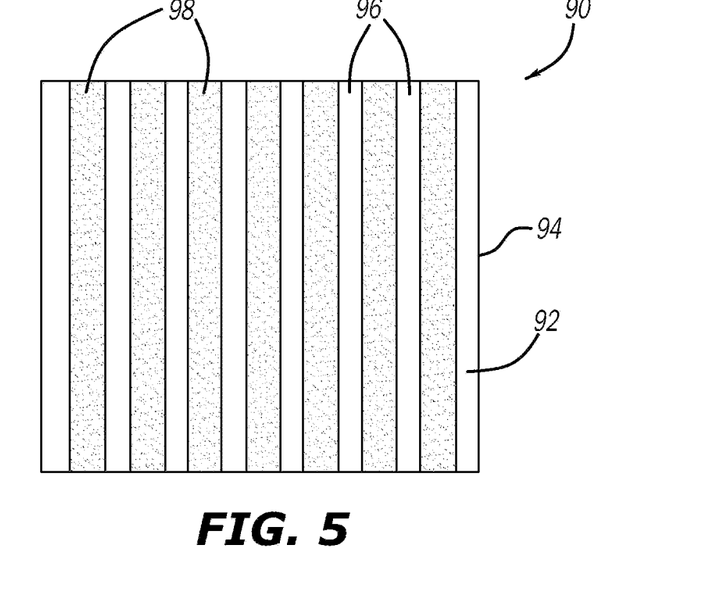
FIG. 5 is a top view of a part being fabricated by, for example, the 3D printing machine shown in FIG. 1, and showing filaments being deposited non-sequentially.

FIG. 5 is a top view of a part 90 (e.g., a high-temperature composite structure) being fabricated by a robotic placement process on a build plate (not shown), such as by the 3D printing machine 10 shown in FIG. 1. As discussed above, the robotic placement process may deposit rows of adjacent filaments 92 to form layers 94 that are stacked on top of each other to form the part 90. Known 3D fabrication processes sequentially deposit each filament 92 directly adjacent to the previously deposited filament 92. There are required tolerances of the positional accuracy of the filaments 92 as they are being deposited, i.e., how far off the position of the filaments 92 can be from a desired location. These tolerances, if directionally similar, tend to accumulate as the filaments 92 are being deposited for a particular layer, which can create a slight overlap of the filaments 92. This overlapping of the filaments 92 when deposited sequentially can, in turn, cause positional errors to accumulate and cascade through a layer. Eventually, if enough overlap has accumulated, there is no longer enough room on the layer 94 in the desired location to deposit the next filament 92. As will be discussed below, according to this embodiment of the disclosure, the part 90 is fabricated by non-sequentially depositing the filaments 92 for each part layer 94. By providing non-sequential depositing of the filaments 92, the tolerances tend to average out and tend not to build up on each other.

As illustrated in this embodiment, a first set of odd-numbered filaments 96 are deposited for a certain one of the layers 94, which defines rows of gaps between adjacent filaments 96 that are about one filament width apart. The fabrication process then deposits a second set of even-numbered filaments 98, shown as being shaded merely for illustration purposes, in the gaps between the filaments 96, where the first set of odd-numbered filaments 92 have already begun to harden, which better defines the gap therebetween. The first set of filaments 96 is referred to as odd-numbered filaments because the first deposited filament in the first set is deposited in row number one, the second deposited filament is deposited in row number three, etc. The second set of filaments 98 is referred to as even-numbered filaments because the first deposited filament in the second set is deposited in row number two, the second deposited filament is deposited in row number four, etc. Thus, instead of depositing the filaments 92 sequentially, where one filament 92 is deposited directly adjacent to the filament 92 that was previously deposited as was done in the prior art, this embodiment deposits the filaments 92 non-sequentially and in spaced relationship so that every other filament 92 is first deposited, and then filaments 92 are deposited in the gaps therebetween. It is noted that although this embodiment deposits the filaments non-sequentially by first depositing the odd-number of rows and then depositing the even-numbered rows, this is merely an example. Other embodiments could deposit the filaments non-sequentially in any suitable manner as long as gaps are provided between each set of filaments that are deposited at a particular time. This process provides a number of advantages including improving the reliability of the fabrication process, reducing the sensitivity of the process to fly height and variations in feedstock material linear density, a higher percentage fill, reduction in part porosity and an increase in part fiber volume.

The filaments 92 can be formed of any material suitable for the purposes discussed herein, such as the various thermoplastics and polymers (or other precursor matrix materials) mentioned above. In one non-limiting embodiment, the filaments 92 comprise, consist essentially of, or consist of continuous fiber filaments, such as continuous carbon fiber (CCF) filaments—which tend to be of higher strength that is desired for certain products—where each filament 92 has many continuous fibers that extend from one end of the filament 92 to the other end of the filament 92 and are encapsulated in a suitable polymer (e.g., one or more of the aforementioned precursor matrix materials) to provide the desired strength. Other suitable continuous fiber filaments may comprise, consist essentially of, or consist of any one or more of the aforementioned fiber materials. Additionally, any of these fibers can be chopped or sectioned so that they are not continuous from one end of the filament 92 to the other end of the filament 92, and are also enclosed within a suitable polymer (e.g., such as one of the aforementioned polymer precursor matrix materials) (or another one or more of the aforementioned precursor matrix materials), which tend to be of a lower strength than continuous fiber filaments. Typical widths of the filaments 92 are in the range of 3.5 mm to 7 mm and a typical thickness of the filaments 92 can be 0.25 mm to 0.5 mm.

Figure 6:
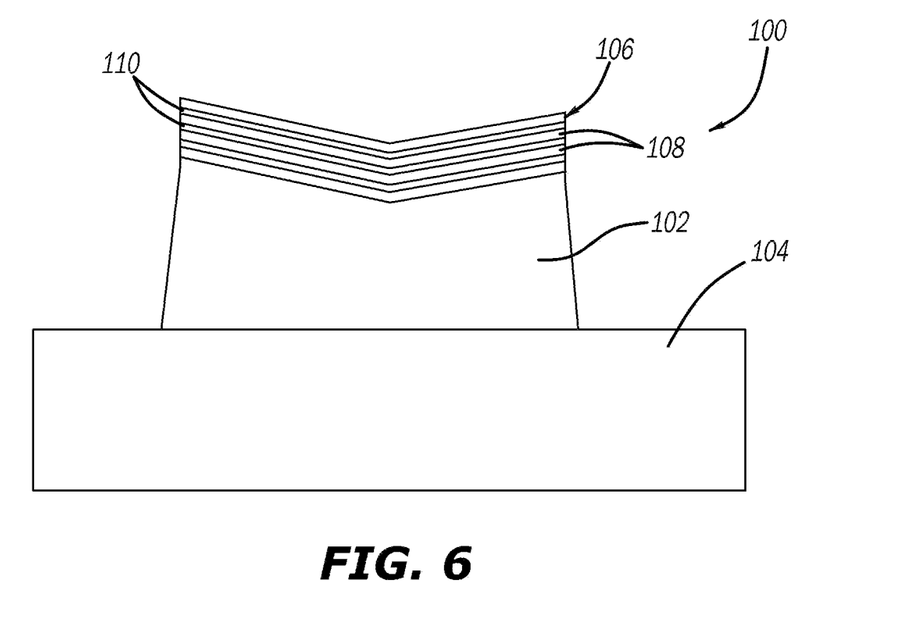
FIG. 6 is a side view of a part being fabricated by, for example, the 3D printing machine shown in FIG. 1, and showing alternating continuous fiber filament layers and polymer filament layers.

FIG. 6 is a side view of a part assembly 100 (e.g., a high-temperature composite structure) fabricated by a robotic placement process, such as by the 3D printing machine 10 shown in FIG. 1. The part assembly 100 includes a support structure 102 fabricated on a build-plate 104 and a part 106 fabricated on the support structure 102. The support structure 102 may be fabricated by the same robotic placement process as the part 106, and may be formed of, for example, layers of pure polymer (or other precursor matrix material) filaments or of polymer (or other precursor matrix material) filaments including chopped or discontinuous fibers of the type discussed above, e.g., for FFF. In some embodiments, to increase the adhesion between the desired part layers, a robotic placement process may fabricate the part layers in an alternating sequence of first layers 108 including filaments made of a desired material for the final part and second layers 110 including filaments made of a desired material to increase or enhance the adhesion between the layers 108 without significantly reducing the structural integrity of the final part. The filaments of one material may be provided, for example, by a first extruder module in the extruder module 60, and the filaments of the other material may be provided by a second extruder module in the extruder module 60. In one non-limiting embodiment, the first layers 108 may include continuous fiber filaments and the second layers 110 may include pure polymer (or other precursor matrix material) filaments or polymer (or other precursor matrix material) filaments with discontinuous fibers. However, it is noted that this is merely for illustrative purposes in that the first layers 108 may be, generally, strength layers while the second layers 110 may be, generally, adhesion layers, which may be other materials than described above.

The thickness of the second layers 110 may be minimized to the extent possible, such as 0.13 mm, or about half of the thickness of the first layers 108. Each layer 108 and 110 may be deposited in any suitable orientation relative to the other layers 108 and 110, such as 0°, 45°, 90°, 135°, etc. This robotic placement process provides a number of advantages including improved reliability of the robotic placement process, improved robotic placement process speed because the second layers 110 can be deposited more quickly than the first layers 108, improved inter-layer adhesion, and a reduction in the permeability of the finished part.

Figure 7:
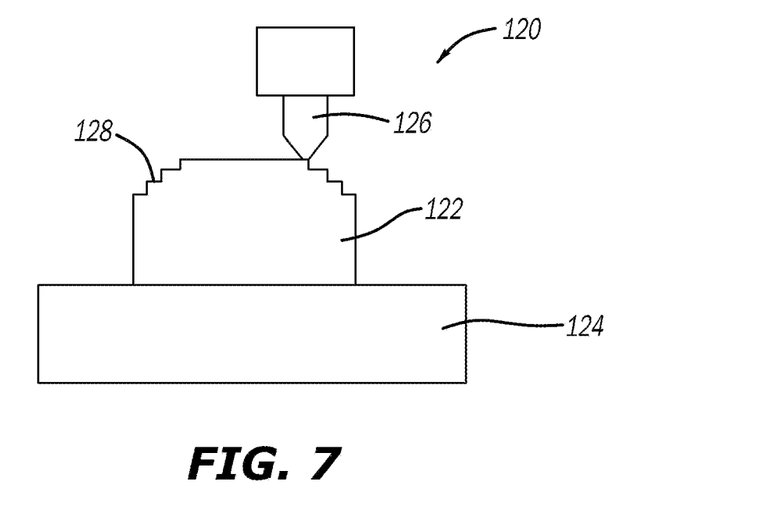
FIG. 7 is a side view of a support structure on which a part will be fabricated by, for example, the 3D printing machine shown in FIG. 1, and showing a support structure deposition nozzle.

FIG. 7 is a side view of a fabrication assembly 120 including a tooling or support structure 122 that has been fabricated by an FFF process, such as by the 3D printing machine 10 shown in FIG. 1, on a build-plate 124, as discussed above. A part (not shown) will be fabricated on the support structure 122 opposite to the build-plate 124. An FFF deposition nozzle 126 is shown relative to the support structure 122 and is intended to represent the nozzle that fabricated the support structure 122, which would have a certain configuration for that purpose. The fabrication process of the support structure 122 would be such that surface imperfections, shown here as steps 128, would form between the separate layers in the support structure 122. The steps 128 reduce the accuracy of depositing the part (not shown) thereon and reduce the ability to remove the part from the support structure 122 without damaging it because the polymer material of the part gets into and is secured within various nooks and crannies within the support structure 122.

Figure 8:
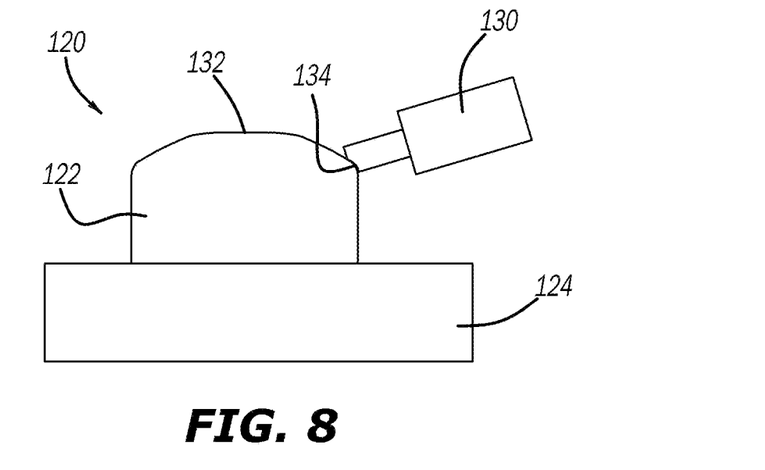
FIG. 8 is a side view of the support structure shown in FIG. 7, and showing a filament deposition nozzle smoothing a top surface of the support structure.

FIG. 8 is a side view of the fabrication assembly 120 showing the support structure 122 on the build-plate 124. According to this embodiment, prior to the part being fabricated on the support structure 122, a nozzle 130 that is used to deposit the filaments for the part may be first heated and then used to smooth out the steps 128 to form a smoothed surface 132 on the support structure 122. The nozzle 130 may be configured to have an indented (e.g., chamfered) or rounded corner 134 that allows the nozzle 130 to more easily provide the desired smoothing affect. In an alternate embodiment, a dedicated ironing tool (not shown) may be used instead of the nozzle 130 to smooth out the surface of the support structure 122. As above, the various filaments for the support structure 122 and the part can be formed of any material suitable for the purposes discussed herein, such as the various thermoplastics and polymers (or other precursor matrix materials) mentioned above. The filaments may include continuous fiber filaments or filaments having fibers that are chopped or sectioned so that they are not continuous from one end of the filament to the other end of the filament, and are also enclosed within a suitable polymer (or other precursor matrix material). This process provides a number of advantages including improved reliability of the robotic placement process and improved finish of the part surface after the support structure 122 is removed.

Accordingly, using the system of FIGS. 1 through 8, for example, a precursor structure—comprising a fiber reinforcing phase embedded within a precursor matrix material—is formed by a manufacturing process, such as, for example, additive manufacturing (e.g., 3D printing) in a manner that may direct printing along even directions that are not strictly within an x-y plane for each respective printed strata of a structure. Therefore, the fibers within the precursor structure may be oriented in any desired direction, including in a direction aligned with a direction of a greatest expected stress to be experienced by the part to be fabricated.

As noted above, in some embodiments, the precursor structure may be provided through other mechanized processes and/or methods.

Figure 9:
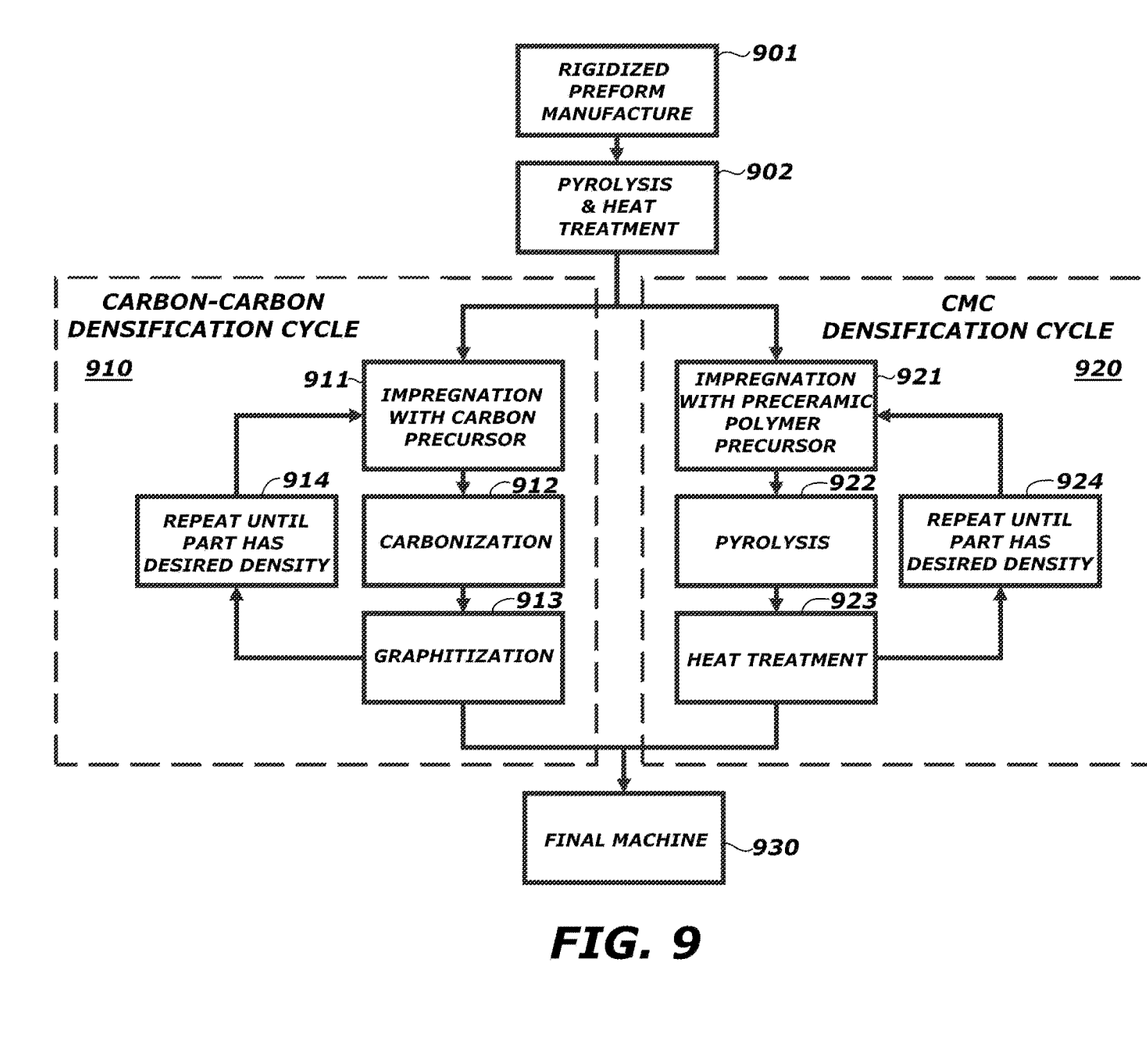
FIG. 9 charts embodiments of methods for fabricating high-temperature composite (e.g., carbon-carbon, ceramic matrix composite) structures, according to the present disclosure.

With reference to FIG. 9, charted are various embodiments for continuing the fabrication of composite structures (e.g., high-temperature composite structures) subsequent to the formation of the initial 3D precursor structure, e.g., after the rigidized preform manufacture 901 of the methods of FIG. 9. The method may continue by subjecting the 3D printed precursor structure to thermal processing (e.g., pyrolysis and heat treatment (stage 902)). During this process, the precursor structure may be exposed to temperatures exceeding about 932° F. (500° C.) (e.g., in one or more high-temperature fabrication stages), during which the precursor matrix material pyrolyzes, and inorganics from the precursor matrix material (if any) outgas, leaving the fibers within a remnant of solidified carbon matrix material. This post-pyrolysis, intermediate structure will be porous and therefore unsuitable for use in high-temperature environments, such as in aerospace flights. Therefore, the method continues by subjecting the post-pyrolysis, intermediate structure to densification processes (e.g., stages or cycles 910 or 920 of FIG. 9).

In embodiments configured to form high-temperature composite structures comprising carbon-carbon composite materials, the post-pyrolysis, intermediate structure may be densified using a carbon-carbon densification cycle 910. The post-pyrolysis, intermediate structure may be impregnated with a carbon precursor 911 and heated (e.g., in an oven, furnace, autoclave, or other high-temperature environment, e.g., at a temperature exceeding about 932° F. (500° C.), e.g., up to a temperature of about 5432° F. (3000° C.)) to carbonize 912 and graphitize 913 the impregnated structure (e.g., separately or concurrently), to add solid carbon material into the pores of the post-pyrolysis, intermediate structure. Various techniques for impregnating porous structures with carbon precursor, e.g., for carbonizing and/or for graphitizing, are generally known in the art and so are not described in detail herein. Therefore, some embodiments of the disclosure may impregnate the structure with carbon using, e.g., melt infiltration, chemical vapor deposition (CVD), or other similar material-infusion processes. However, in some embodiments of the disclosure, the post-pyrolysis, intermediate structure may be impregnated with the carbon precursor (e.g., in stage 911) in the form of a liquid resin (e.g., a liquid organic resin). In some embodiments in which the precursor matrix material comprised a carbon precursor material, the carbon precursor (e.g., the liquid organic resin) for stage 911 may have the same formula as the precursor matrix material, though with a lower viscosity. The liquid organic resin may be a low-viscosity, liquid organic resin. As used herein "low-viscosity" may mean and refer to a viscosity not exceeding about 50 seconds, when measured using the Saybolt Furol method (ASTM E102). In some embodiments, the viscosity of the liquid resin (e.g., the liquid organic resin; e.g., the low-viscosity, liquid organic resin) may be tailored to be low enough to enable the liquid to enter pores of the post-pyrolysis, intermediate structure and high enough to enable carbon of the liquid organic resin to deposit on already-solidified carbon material during the subsequent carbonization 912 and graphitization 913 stages.

Stages 911, 912, and 913 may, optionally, be repeated (as indicated by stage 914), as desired, until the now-rigid, high-temperature composite structure (e.g., in this embodiment, a high-temperature carbon-carbon composite structure) exhibits a desired density. The resulting structure will be substantially non-porous (e.g., less porous than that following the pyrolysis and heat treatment stage 902) and conducive for use in high-temperature environments.

In embodiments to form the high-temperature composite structure as a ceramic matrix composite (CMC) structure, following the pyrolysis and heat treatment of stage 902, the post-pyrolysis, intermediate structure may be densified by a CMC densification cycle 920, which includes impregnating the post-pyrolysis, intermediate structure with a preceramic polymer precursor material 921. As above, the impregnation may be carried out using material-infusion methods such as melt infiltration, chemical vapor deposition (CVD), or other similar material-infusion methods. In other embodiments, impregnating the post-pyrolysis, intermediate structure with a preceramic polymer precursor material 921 may use a liquid resin. For example, in embodiments in which the precursor matrix material for the 3D printing process was a preceramic polymer precursor material, the preceramic polymer precursor material of stage 921 may have a formula the same as the precursor matrix material for the 3D printing process, though—in at least some embodiments—with a lower viscosity. Therefore, in some embodiments, the preceramic polymer precursor material of stage 921 may, like the carbon precursor of stage 911, be a low-viscosity, liquid resin. Heating the impregnated structure (e.g., in an oven, furnace, autoclave, or other high-temperature environment, e.g., at a temperature exceeding about 932° F. (500° C.), e.g., up to a temperature of about 3000° F. (1649° C.)), subjects the impregnated structure to pyrolysis 922 and heat treatment 923 to solidify the ceramic material within the preceramic polymer precursor material. Stages 921, 922, and 923 may, optionally, be repeated (as indicated by stage 924) one or more times until the now-rigid, high-temperature composite structure (e.g., in this embodiment, a high-temperature CMC structure) exhibits a desired density. The resulting structure will be substantially non-porous (e.g., less porous than that following the pyrolysis and heat treatment stage 902) and conducive for use in high-temperature environments.

In some embodiments, both the carbon-carbon densification cycle(s) 910 and the CMC densification cycle(s) 920 may be used in the method of fabricating the high-temperature composite structure. For example, after pyrolysis and heat treatment (stage 902), the post-pyrolysis, intermediate structure may be subjected to the carbon-carbon densification cycle 910 one or more times and then subjected to the CMC densification cycle 920 one or more times, vice versa, and/or the cycles may be alternated. As another example, after pyrolysis and heat treatment (stage 902), the post-pyrolysis, intermediate structure may be subjected to one or more of the carbon-carbon densification cycles 910 or one or more of the CMC densification cycles 920, then to one or more of the other of the cycles 910, 920, before being subjected again to the original one of the cycles 910, 920. So, the method may include only the carbon-carbon densification cycles 910 one or multiple (e.g., two to ten, or more) times, only the CMC densification cycles 920 one or multiple (e.g., two to ten, or more) times, or some combination of the two cycles 910, 920 in any order.

After the densification cycle(s) 910, 920 the now-rigid, densified, nonporous structure may then be subject to final processing (e.g., final machining 930) to complete the fabrication of the structure, though it is expected that the final machining 930 may be relatively minor trimming, drilling of holes, etc., compared to conventional fabrication processes. In other words, the final machining 930 may not include addition of seals, attachments of joints, or complex assembly of several smaller parts because the methods disclosed herein enable formation of integral part, even large, intricate parts.

Because the 3D printing (i.e., the rigidized preform manufacture 901) process used in the embodiments of the disclosure enable true 3D printing (e.g., using the machine and system of FIGS. 1 through 8), and enable forming even intricate structures with void space without having to extensively post-shape the structure, complex and large parts may be formed as unitary, integral pieces, e.g., without the extensive cost and time that would normally be required for complicated molds or post-processing machining.

Figure 10:
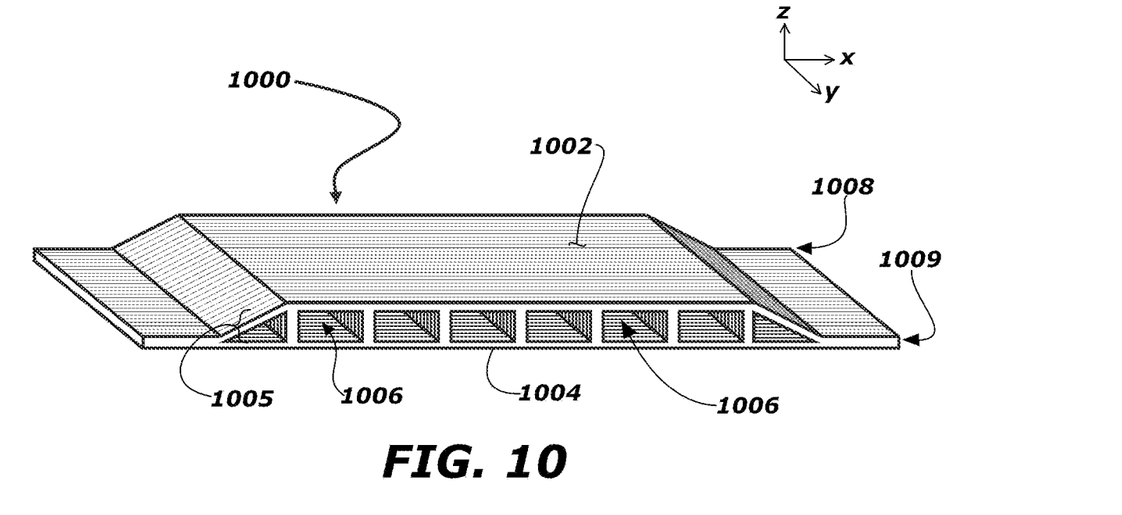
FIG. 10 is a perspective, schematic illustration of a high-temperature composite structure, having a sandwich structure form, formable according to embodiments of the present disclosure.

For example, FIG. 10 illustrates a high-temperature composite structure 1000 that may be formed using any of the embodiments and materials described above. The high-temperature composite structure 1000 may be a sandwich structure, with a pair of at least partially planar and continuous portions (e.g., surfaces) (e.g., an upper portion 1002, a lower portion 1004) between which is an intermediate portion 1005 defining a series of cells 1006 of void space. Notably, by the methods of the disclosure, the upper portion 1002, the intermediate portion 1005, and the lower portion 1004 may all be integrally formed within one another. For example, using the machine and system of FIG. 1 (or other suitable formation process) and the aforementioned precursor matrix material with embedded fiber material as the filament 42 used in the machine of FIG. 1, and defining a horizontal plane (e.g., horizontal to the surface of the earth, normal to the direction of gravity) as defining an x-y plane (as indicated in the axis guide of FIG. 10), the high-temperature composite structure 1000 of FIG. 10 may be formed in the y-axis direction, from rear 1008 to front 1009 in successive individual or coiled layers building the high-temperature composite structure 1000 in the horizontal direction (e.g., because the machine of FIG. 1 enables other than mere x-y then z-axis orientations of laying down the filament 42). The 3D printed precursor structure may then be subjected to the remaining stages of the method(s) of FIG. 9 to form the completed, high-temperature, composite structure 1000 of FIG. 10.

Structures formed by the methods of the present disclosure may be configured for use in a variety of structures, e.g., aerospace structures (e.g., vehicles or components thereof (e.g., rocket nozzles, thermal protection systems (TPS), inlets, isolators, antenna windows)), aeronautical structures (e.g., jet engine components), high-speed structures (e.g., vehicles or components thereof (e.g., vehicles configured to travel at speeds of at least, e.g., Mach 5)), nuclear reactor shielding, internal combustion engine components (e.g., cylinders, pistons, engine blocks), etc.

Structures formed by the methods herein may also be configured and conducive for use in environments with significant fluctuations in temperatures. For example, the composite materials of the resulting high-temperature composite structures may exhibit negligible or low coefficients of thermal expansion (CTE). Therefore, if subjected to environments passing through great differences in temperature (e.g., orbiting in space with 200°+temperature differentials), the structure of the high-temperature composite structures may retain their fabricated structure (e.g., optical bench structures), rather than warping and distorting in shape.

While the disclosed methods, stages, materials, structures, apparatus, and systems are susceptible to various modifications and alternative forms in implementation thereof, specific embodiments have been shown by way of example in the drawings and have been described in detail herein. However, the disclosure is not intended to be limited to the particular forms disclosed. Rather, the disclosure encompasses all modifications, combinations, equivalents, variations, and alternatives falling within the scope of the disclosure as defined by the following appended claims and their legal equivalents.

What is claimed is:

1. A method for forming a composite structure, the method comprising:
    forming a precursor structure, comprising:
        drawing a filament from a spool on which the filament is wound to deposit an amount of filament material; and
        drawing more of the filament from the spool to deposit an additional amount of the filament material on the amount of the filament material,
        the filament material comprising a precursor matrix material having embedded therein a reinforcing material; and
    heating the precursor structure to solidify at least some of the precursor matrix material and form an intermediate structure;
    impregnating the intermediate structure with a liquid resin to add carbon or ceramic material to the intermediate structure and form a densified structure; and
    heating the densified structure at a temperature between about 932° F. and about 5432° F.

2. The method of claim 1, wherein impregnating the intermediate structure with the liquid resin comprises impregnating the intermediate structure with a liquid preceramic polymer precursor material.

3. The method of claim 1, wherein impregnating the intermediate structure with the liquid resin comprises impregnating the intermediate structure with a liquid organic precursor material comprising carbon.

4. The method of claim 1, wherein drawing the filament and drawing the more of the filament from the spool comprises passing the filament and the more of the filament through at least one nozzle.

5. The method of claim 1, wherein forming the precursor structure comprises orienting the reinforcing material along a non-horizontal axis.

6. The method of claim 1, wherein, in forming the precursor structure, the reinforcing material embedded in the precursor matrix material of the filament material is a continuous fiber material.

7. The method of claim 1, wherein, in forming the precursor structure, the reinforcing material embedded in the precursor matrix material of the filament material comprises discrete strands of a fiber material.

8. The method of claim 1, further comprising repeating the impregnating and the heating at least one additional time.

9. A method of forming a high-temperature carbon-carbon or ceramic matrix composite structure, the method comprising:
    operating a robotic 3D printing machine to form a 3D precursor structure defining at least one void between substantially-nonporous portions, the operating comprising:
        drawing a filament from a spool on which the filament is wound to deposit an amount of filament material, the filament material comprising a precursor matrix material having embedded therein a fiber reinforcing material;
        laying the filament along an axis; and
        drawing more of the filament from the spool to deposit an additional amount of the filament material on the amount of the filament material;
    pyrolyzing the 3D precursor structure at a temperature exceeding about 932° F. to solidify at least some of the precursor matrix material and form a porous intermediate structure;
    introducing, into pores of the porous intermediate structure, a liquid resin comprising carbon or a preceramic material to impregnate the porous intermediate structure with the liquid resin to add the carbon or a ceramic material to the porous intermediate structure and form a densified and impregnated intermediate structure; and
    heating the densified and impregnated intermediate structure at a temperature between about 932° F. and about 5432° F.

10. The method of claim 9, lacking use of a prefabricated mold.

11. The method of claim 9, wherein:
    drawing the filament from the spool comprises drawing the filament from the spool through a nozzle of the robotic 3D printing machine; and
    laying the filament along the axis comprises directing the nozzle of the robotic 3D printing machine along a horizontal direction.

12. The method of claim 9, wherein:
    pyrolyzing the 3D precursor structure at the temperature exceeding about 932° F. comprises pyrolyzing the 3D precursor structure at a temperature exceeding about the 932° F., up to about 5432° F.

13. The method of claim 9, further comprising, after heating the densified and impregnated intermediate structure at the temperature between about 932° F. and about 5432° F., impregnating with more of the liquid resin.

14. A composite structure, formed by the method of claim 1, the composite structure comprising:
    an intermediate portion, defining a series of cells, between an upper portion and a lower portion,
    the intermediate portion, the upper portion, and the lower portion each comprising a composite material comprising the reinforcing material embedded within a matrix phase formed from the precursor matrix material,
    the intermediate portion, the upper portion, and the lower portion being integral with one another.

15. The composite structure of claim 14, wherein the matrix phase comprises a carbon-based material.

16. The composite structure of claim 14, wherein the matrix phase comprises a ceramic material.

17. The composite structure of claim 14, wherein the upper portion and the lower portion define at least partially planar, continuous surfaces.

18. The composite structure of claim 14, wherein the composite structure comprises at least a portion of a structure of a rocket nozzle, a thermal protection system (TPS), or a vehicle configured to travel at speeds of at least about Mach 5.

19. The composite structure of claim 14, wherein the composite material of the intermediate portion, the upper portion, and the lower portion is substantially non-porous.

20. The composite structure of claim 14, wherein the composite material comprises solid carbon or solid ceramic material within pores of the matrix phase.

* * * * *